United States Patent Office 2,717,351
Patented Sept. 6, 1955

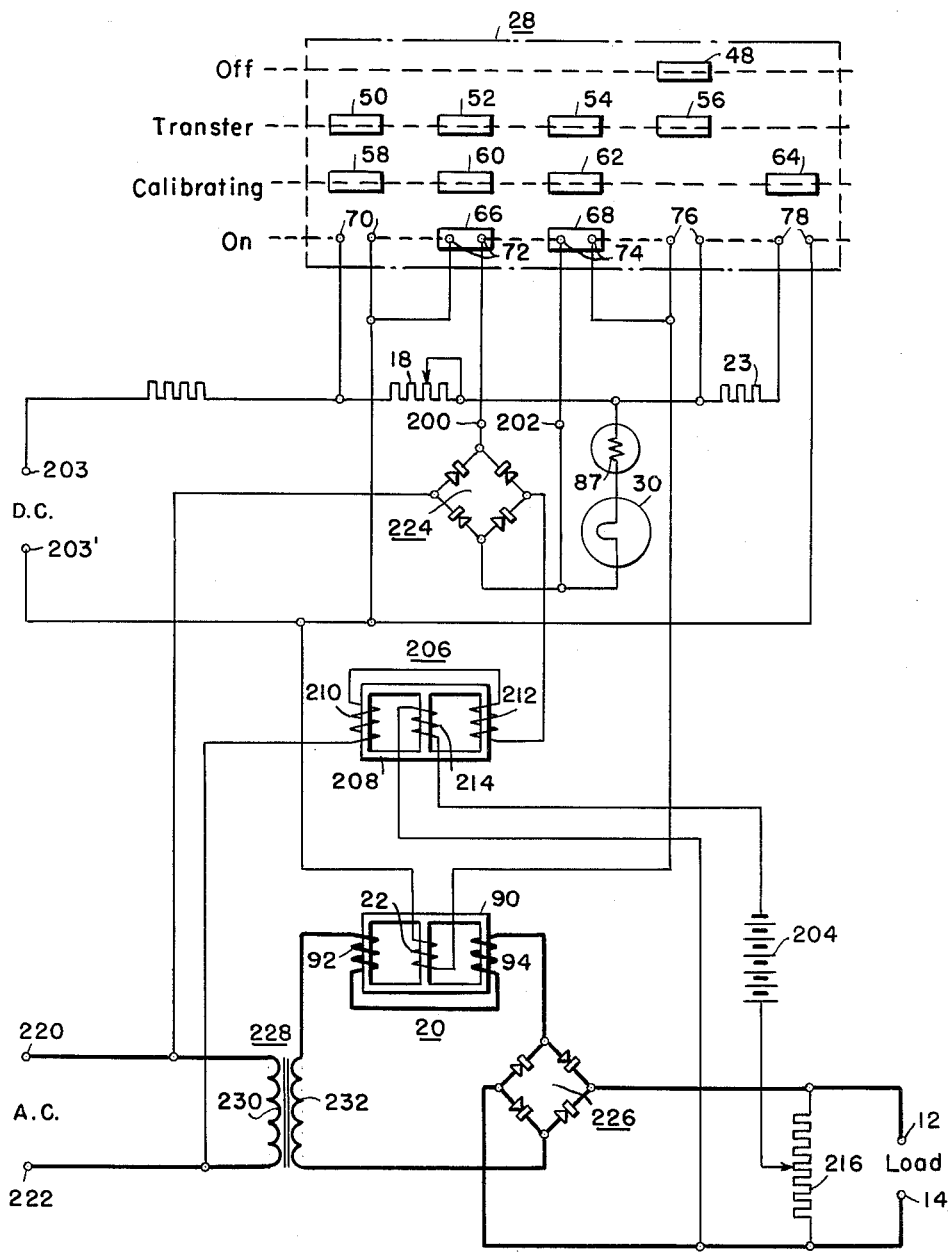

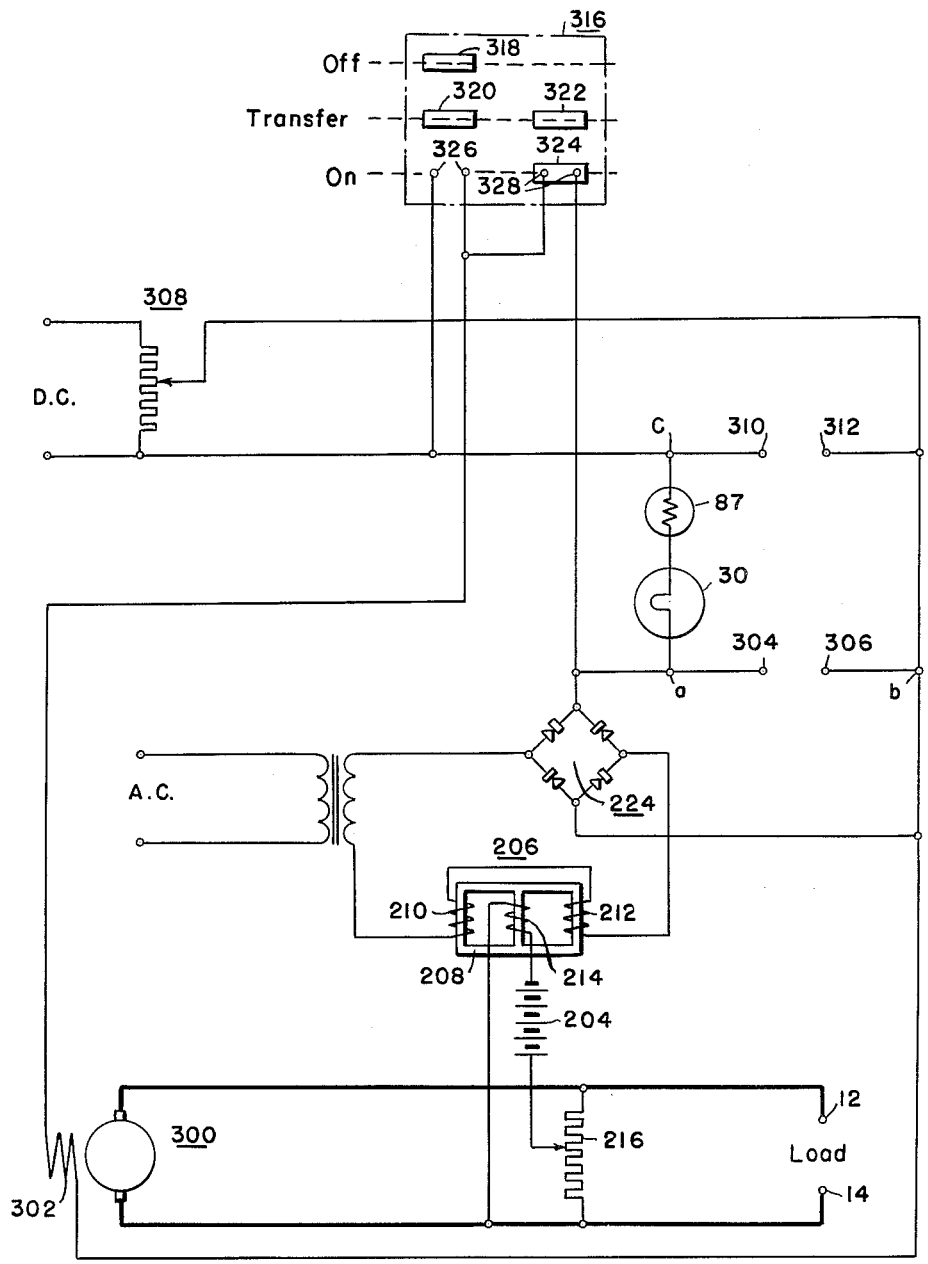

2,717,351

REGULATORS

Carl A. Christian, Turtle Creek, and Slavo J. Murcek, White Oak, Pa., assignors to Westinghouse Electric Corporation, East Pittsburgh, Pa., a corporation of Pennsylvania Application October 15, 1953, Serial No. 386,324

7 Claims. (Cl. 321—18)

This invention relates to regulator systems and, more particularly, to control means for effectively switching the regulator system from automatic to manual control.

In many applications, a plurality of regulator systems are paralleled in order to maintain a substantially constant output voltage to a common load. If the output voltage of one of these paralleled regulator systems is momentarily interrupted, the load on the other paralleled regulator systems is increased which oftentimes effects a shutdown of these regulator systems. Further, when switching from automatic to manual control in regulator systems, a momentary interruption in the current flow to a control element in the regulator system will oftentimes effect a shutdown of the regulator system due to an inductive transient potential from the control element.

Heretofore, the output voltage of the regulator system has been continuously maintained at the load when switching from automatic to manual control by gradually increasing the resistance in the regulator circuit until the regulator is no longer automatically controlled. However, the increased resistance in the regulator circuit effects a drop in the output voltage of the regulator system.

An object of this invention is to provide for maintaining an uninterrupted supply of voltage or current from the output of a regulator system even though the regulator system is switched from automatic to manual control.

Another object of this invention is to provide for readily switching from automatic to manual control in a regulator system without changing the magnitude of the output voltage of the regulator system, by effectively balancing in a Wheatstone bridge a signal responsive variable impedance against a manually controlled variable impedance so that the output voltage of the regulator system remains substantially unchanged when switching from automatic to manual control.

Still another object of this invention is to provide for maintaining a continuous supply of current to a control element disposed in a regulator system, even though the regulator system is switched from automatic to manual control, to thus prevent an inductive transient potential in the regulator system which would render it inoperative.

A further object of this invention is to provide for preventing the overloading of a regulator system that is paralleled with another regulator system, even though the latter regulator system is switched from automatic to manual control, by maintaining an uninterrupted conducting path in the latter regulator system so that the output voltage of the latter regulator system is continuously maintained.

A still further object of this invention is to provide for readily switching from automatic to manual control in a regulator system without effecting a change in the output voltage of the regulator system, by maintaining an uninterrupted control circuit within the regulator system by the establishment of a plurality of parallel conducting paths as the regulator system is being switched from automatic to manual control, and by establishing a Wheatstone bridge at one step of this switching operation so that a manually controlled variable impedance can be quickly compared with a signal responsive variable impedance, to thus render the magnitude of the output voltage of the regulator system substantially unchanged in switching from automatic to manual control.

Still another object of this invention is to provide for readily switching from automatic to manual control in a regulator system without effecting a change in the magnitude of the output voltage of the regulator system, by the establishment of a plurality of parallel conducting paths as the regulator system is being switched from automatic to manual control, and by balancing, at one step of this switching operation, a voltage proportional to the output voltage of the regulator system against a manually adjusted voltage, to thus render the magnitude of the output voltage of the regulator system substantially unchanged in switching from automatic to manual control.

Other objects of this invention will become apparent from the following description when taken in conjunction with the accompanying drawings, in which:

Fig. 2 is a schematic diagram of apparatus and circuits embodying a modification of the embodiment of Fig. 1 within the scope of the teaching of this invention, and Fig. 3 is a schematic diagram of apparatus and circuits illustrating another embodiment of this invention.

Figure 1:
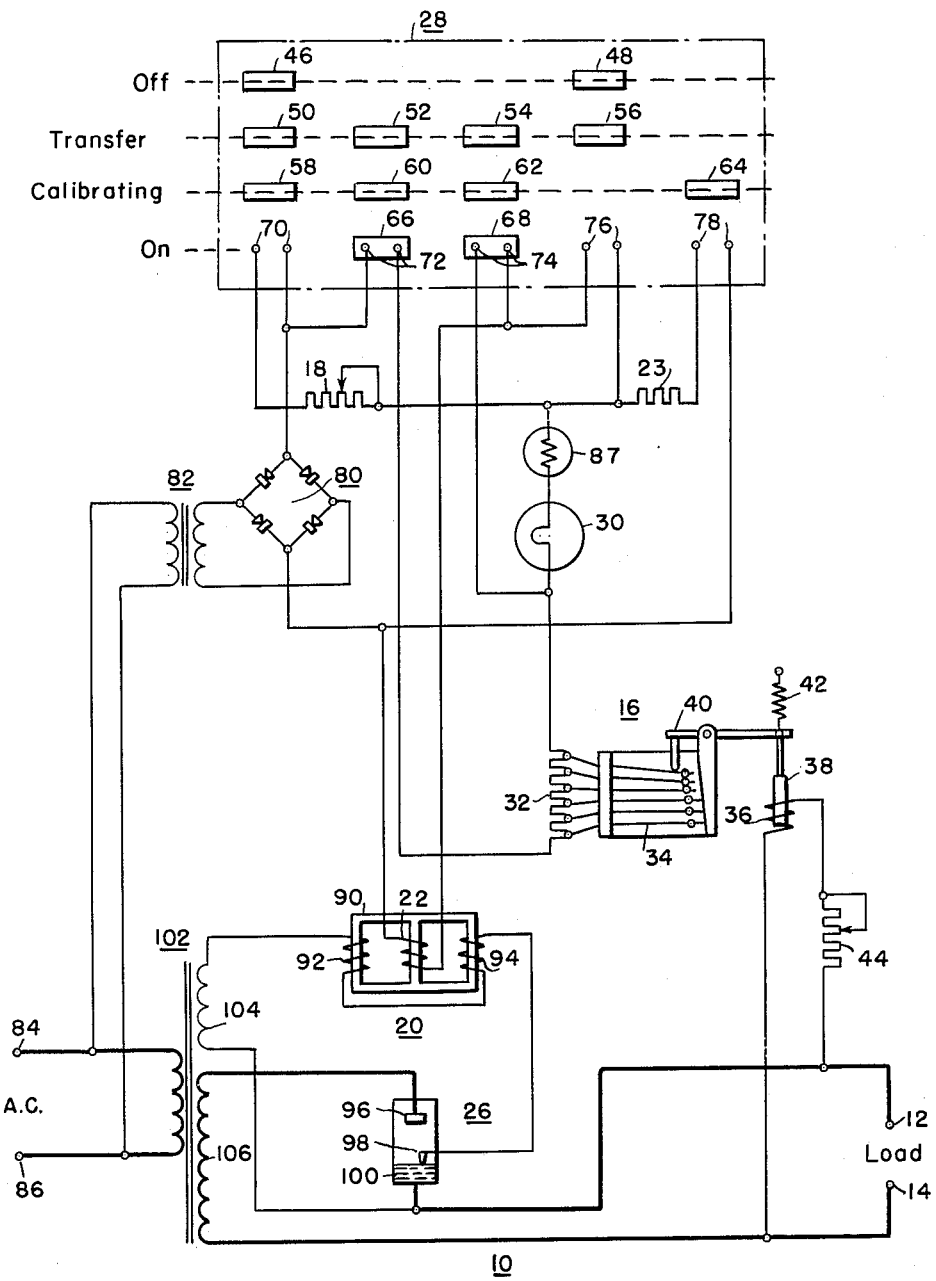
Figure 1 is a circuit diagram including apparatus connected in accordance with the teaching of this invention which enables the switching from automatic control to manual control without opening the circuit.

Referring to Fig. 1, there is illustrated a regulator system 10 for maintaining the magnitude of the output voltage of the regulator system, as it appears across the output terminals 12 and 14, substantially constant. In general, the regulator system 10 comprises a signal responsive variable impedance 16, the impedance of which is controlled in response to the magnitude of the voltage across the output terminals 12 and 14, a manually controlled variable impedance 18, a phase shifting reactor 20 including a control winding 22, a preselected impedance 23 for matching the impedance of the control winding 22 and an ignitron rectifier 26, the output of the rectifier being connected to vary the magnitude of the voltage across the output terminals 12 and 14 and the output current of the rectifier 26 being controlled by the phase shifting reactor 20.

The regulator system 10 also broadly includes switching means 28 for selectively connecting, first, the signal responsive variable impedance 16 in circuit relationship with the control winding 22 of the reactor 20 so that the control winding 22 is responsive to the magnitude of the voltage across the output terminals 12 and 14, second, for connecting a series circuit including the manually controlled variable impedance 18, the control winding 22 of the reactor 20, and the preselected impedance 23 in parallel circuit relationship with the signal responsive variable impedance 16 so as to establish a Wheatstone bridge, the four legs of which comprise the impedances 16, 18 and 23, and the control winding 22, third, for connecting the manually controlled variable impedance 18 in parallel circuit relationship with the signal responsive variable impedance 16, and, fourth, for disconnecting the signal responsive variable impedance 16 from the control winding 22 of the reactor 20 so that the manually controlled variable impedance 18 can be adjusted to control the magnitude of the current flow through the control winding 22 and thus the magnitude of the voltage across the output terminals 12 and 14, and indicating means 30 connected across the diagonal of the Wheatstone bridge for indicating when the impedance of the manually controlled variable impedance 18 matches the impedance of the signal responsive variable impedance 16.

In this instance, the signal responsive variable impedance 16 includes a resistor 32 and a plurality of electrical conducting leaf members 34 which are electrically connected to the resistor 32 in order to shunt out a portion of the resistor 32 in accordance with the magnitude of the voltage across the output terminals 12 and 14. In order to vary the impedance of the resistor 32, and thus the magnitude of the current flow through a given circuit comprising the leg of the Wheatstone bridge which includes the resistor 32, in accordance with the magnitude of the voltage across the output terminals 12 and 14, control means including an operating coil 36, an armature 38, and an actuating member 40 is provided. In particular, the armature 38 is mechanically connected to the actuating member 40 through a suitable mechanical linkage so that the operating coil 36 can effect an actuation of the actuating member 40 in accordance with the magnitude of the voltage across the output terminals 12 and 14. As illustrated, a tension spring 42 is mechanically connected to the armature 38, the spring 42 opposing the action of the operating coil 36. For the purpose of varying the value of the regulated output voltage, as it appears across the output terminals 12 and 14, a variable resistor 44 is connected in series circuit relationship with the operating coil 36, the series circuit being connected across the terminals 12 and 14.

As illustrated, the switching means 28 is a manually controlled drum controller having four positions. However, it is to be understood that other types of manually or electrically controlled switching means could be substituted for the drum controller 28 illustrated in Fig. 1. As diagrammatically illustrated, the drum controller 28 comprises a plurality of movable contact members 46, 48, 50, 52, 54, 56, 58, 60, 62, 64, 66 and 68 which are disposed to be selectively actuated into engagement with a plurality of stationary contacts 70, 72, 74, 76 and 78. As will be explained more fully hereinafter in the description of the operation of the apparatus of Fig. 1, the regulator system 10 can be switched from automatic to manual control without interrupting the conducting path to the control element or winding 22 of the saturable reactor 20, thus preventing an inductive transient potential in the regulator system that would render it inoperative by the actuation of the protective breaker (not shown) to the open position.

As hereinbefore mentioned, a Wheatstone bridge is established during the aforementioned switching operation. In order to supply direct-current energy to this Wheatstone bridge, a full-wave dry-type rectifier 80 is provided. In particular, the output terminals of the rectifier 80 are connected across one diagonal of the Wheatstone bridge, one of the output terminals of the rectifier 80 being connected to the junction point of the impedances 16 and 18 when the switching means 28 is in the calibrating position, and the other output terminal of the output 80 being connected to the junction point of the preselected impedance 23 and the operating coil 22 of the reactor 20 when the switching means 28 is so positioned. The input terminals of the rectifier 80 receive energy from a potential transformer 82 which, in turn, receives energy from a suitable source of alternating current which is connected to the input terminals 84 and 86.

In order to quickly determine when the impedance of the manually controlled variable impedance matches the impedance of the signal responsive variable impedance 16, the indicating means 30 is connected across the other diagonal of the Wheatstone bridge. Specifically, the indicating means 30, which in this instance is a lamp, is connected in series circuit relationship with a ballast lamp 87, one end of the series circuit being connected to the junction point of the impedances 18 and 23 and the other end of the series circuit being connected to the junction point of the impedance 16 and the operating coil 22 of the reactor 20. In operation, the ballast lamp 87 functions to maintain the current flow through the indicating lamp 30 substantially constant and thus prevent damage to the lamp 30 by an excessive current flow therethrough.

Referring more particularly to the phase shifting reactor 20, this reactor includes a three-legged magnetic core member 90, load windings 92 and 94 which are disposed in inductive relationship with the outer legs of the core member 90, and the control winding 22 which is disposed in inductive relationship with the middle leg of the core member 90. The control means or control winding 22 effects a variation in the magnitude of the voltage across the output terminals 12 and 14 since the magnitude of the current flow through the winding 22 controls the inductance of the load windings 92 and 94 which are so connected to the input of the ignitron rectifier 26 as to effect a variation in the firing angle of the rectifier depending upon whether the voltage across the terminals 12 and 14 is above or below the regulated value.

As illustrated, the ignitron rectifier 26 includes an anode 96, an ignitor 98, and a mercury pool cathode 100. In order to provide an anode or input voltage and an ignitor or control voltage for the rectifier 26, a potential transformer 102 having secondary winding sections 104 and 106 is provided. Thus, the potential transformer 102 functions as a source of alternating supply voltage. The anode or input voltage for the rectifier 26 is secured by connecting one end of the secondary winding section 106, of the transformer 102, to the anode 96 of the rectifier 26, the other end of the secondary winding section 106 being connected to the cathode 100 of the rectifier 26 through a load (not shown) connected to the output terminals 12 and 14. On the other hand, the ignitor or control voltage for the rectifier 26 is secured by connecting the secondary winding section 104, of the transformer 102, in series circuit relationship with the load windings 92 and 94 of the reactor 20, one end of this series circuit being connected to the cathode 100 of the rectifier 26 and the other end of the series circuit being connected to the ignitor 98. In operation, the phase positioning of the ignitor voltage with respect to the anode voltage of the rectifier 26 is controlled in accordance with the magnitude of the inductance of the load windings 92 and 94 of the reactor 20.

The operation of the apparatus illustrated in Fig. 1 will now be described. When the regulator system 10 is in the automatic position, the drum controller 28 is in the "on" position. That is, the movable contact member 66 is in engagement with the stationary contacts 72 and the movable contact member 68 is in engagement with the stationary contacts 74. With the drum controller 28 so positioned, the signal responsive variable impedance 16, and thus the leg of the Wheatstone bridge which includes the resistor 32, is connected in circuit relationship with the control means or winding 22 of the reactor 20 so that the control winding 22 is responsive to the magnitude of the voltage across the output terminals 12 and 14. This circuit extends from one of the output terminals of the rectifier 80 through the control winding 22 of the reactor 20, the movable contact member 68 of the drum controller 28, the resistor 32 of the signal responsive variable impedance 16, and the movable contact member 66 of the drum controller 28, to the other output terminal of the rectifier 80.

In operation, when the magnitude of the voltage across the output terminals 12 and 14 increases to a value above the regulated value and the drum controller is in the "on" position, the current flow through the operating coil 36 increases to thereby effect an actuation of the actuating member 40 in such a direction as to increase the impedance of the signal responsive variable impedance 16. With an increase in the impedance of the resistor 32, the current flow through the control winding 22 of the phase-shifting reactor 20 is decreased to thereby increase the magnitude of the inductance of the load windings 92 and 94 of the reactor 20. An increase in the inductance of the load windings 92 and 94 increases the firing angle between the ignitor voltage and anode voltage of the ignitron rectifier 26. This, in turn, decreases the output current of the rectifier 26 to thus effect a decrease in the magnitude of the voltage across the output terminals 12 and 14 to the regulated value.

On the other hand, when the magnitude of the voltage across the output terminals 12 and 14 decreases to a value below the regulated value, the current flow through the operating coil 36 decreases to thereby effect a decrease in the impedance of the signal responsive variable impedance 16. In particular, the resistance of the resistor 32 is decreased to thereby increase the current flow through the control winding 22 of the reactor 20. An increased current flow through the control winding 22 decreases the inductance of the load winding 92 and 94 of the reactor 20 to thereby decrease the firing angle between the ignitor voltage and anode voltage of the rectifier 26. With a decrease in the firing angle, the rectifier 26 fires earlier to thereby increase its output current and thus effect an increase in the magnitude of the voltage across the output terminals 12 and 14 to the regulated value.

When switching the regulator system 10 from automatic to manual control, the drum controller 28 is actuated first to the "calibrating" position. With the drum controller 28 so positioned, a Wheatstone bridge is established which enables the impedance of the manually controlled variable impedance 18 to be quickly compared with the impedance of the signal responsive variable impedance 16 to thus render the magnitude of the voltage across the output terminals 12 and 14 substantially unchanged in switching from automatic to manual control. Specifically, the manually controlled variable impedance 18 is adjusted, until the indicating lamp 30 no longer glows. When the lamp 30 no longer glows, the impedances 16 and 18 are properly matched. Thus, by manually adjusting the current flow in the leg of the Wheatstone bridge that contains the impedance 18, a proper balance of the Wheatstone bridge can be obtained.

When the drum controller 28 is switched to the "calibrating" position, a series circuit including the impedances 18 and 23 and the control winding 22 of the reactor 20, is connected in parallel circuit relationship with the signal responsive variable impedance 16. This series circuit extends from one side of the signal responsive variable impedance 16 through the movable contact member 68 of the drum controller 28, the operating coil 22 of the reactor 20, the movable contact member 64 of the drum controller 28, the impedances 23 and 18, the movable contact member 58 of the drum controller 28, and the movable contact member 66, to the other end of the signal responsive variable impedance 16. In other words, a series circuit including the control winding 22, the impedance 23, and a circuit which comprises the leg of the Wheatstone bridge, which in turn includes the impedance 18, is connected in parallel circuit relationship with a circuit which includes the leg of the Wheatstone bridge that has the resistor 32 disposed therein, so that the voltage across the leg of the Wheatstone bridge including the impedance 18 can be calibrated against the voltage across the leg of the Wheatstone bridge including the resistor 32. Therefore, even though a Wheatstone bridge is established for the aforementioned balancing purposes, the conducting path to the operating coil 22 of the reactor 20 is not interrupted, which interruption would effect an inductive kickback from the control winding 22 which could effect a shutdown of the apparatus illustrated in Fig. 1, since it might effect an actuation of the protective breaker (not shown) to the open position.

Once the impedances 16 and 18 have been properly matched, the drum controller 28 is actuated to the "off" position. However, before reaching the "off" position, the drum controller 28 passes through the "transfer" position so as not to interrupt the conducting path to the operating coil 22 of the reactor 20.

When the drum controller 28 is in the "transfer" position, the manually controlled variable impedance 18, and thus the leg of the Wheatstone bridge including the impedance 18, is connected in parallel circuit relationship with the signal responsive variable impedance 16, and thus in parallel circuit relationship with the leg of the Wheatstone bridge including the impedance 16, this parallel circuit being connected in series circuit relationship with the control winding 22 of the reactor 20. The series circuit including the parallel connected impedances 16 and 18 is connected across the output terminals of the rectifier 80. This circuit extends from one of the output terminals of the rectifier 80 through the control winding 22 of the reactor 20, and a parallel circuit, one branch of which includes the movable contact member 56 of the drum controller 28, the manually controlled variable impedance 18, and the movable contact member 50 of the drum controller 28, and the other branch of which includes the movable contact member 54 of the drum controller 28, the signal responsive variable impedance 16, and the movable contact member 52 of the drum controller 28, to the other output terminal of the rectifier 80.

When the drum controller 28 is actuated to the "off" position, the signal responsive variable impedance 16, and thus the leg of the Wheatstone bridge including the impedance 16, is disconnected from the control winding 22. However, the manually controlled variable impedance 18 remains connected in circuit relationship with the control winding 22. The circuit that remains from the previous "transfer" position and that connects the impedance 18 in circuit relationship with the control winding 22, extends from one of the output terminals of the rectifier 80 through the control winding 22 of the reactor 20, the movable contact member 48 of the drum controller 28, the manually controlled variable impedance 18, and the movable contact member 46 of the drum controller 28, to the other output terminal of the rectifier 80. With the drum controller 28 in the "off" position, the magnitude of the voltage across the output terminals 12 and 14 can be varied by adjusting the impedance 18.

Thus, in operation the conducting path of the control winding 22 of the reactor 20 is at no time interrupted in switching from the "on" position to the "off" position, in other words from automatic to manual control. Further, by calibrating the manually controlled variable impedance 18 against the signal responsive variable impedance 16 at one step of the switching operation, the magnitude of the voltage across the output terminals 12 and 14 remains substantially unchanged.

Referring to Fig. 2, there is illustrated another embodiment of this invention in which like components of Figs. 1 and 2 have been given the same reference characters. The main distinction between the apparatus illustrated in Figs. 1 and 2 is that in the apparatus of Fig. 2, a variable direct-current voltage proportional to the magnitude of the voltage across the output terminals 12 and 14 is applied to a set of terminals 200 and 202 which are disposed in one leg of the Wheatstone bridge, instead of varying the current flow through the signal responsive variable impedance 16 as was the case with the apparatus illustrated in Fig. 1. As illustrated, the terminals 200 and 202 are disposed in the leg of the Wheatstone bridge corresponding to the leg that the signal responsive variable impedance 16 is disposed in. Direct-current energy for the Wheatstone bridge, that can be established by the apparatus illustrated in Fig. 2, is obtained from the terminals 203 and 203' which have applied thereto a substantially constant direct-current voltage. In particular, the terminals 203 and 203' are connected across one diagonal of the Wheatstone bridge.

In order to establish a predetermined reference point, as will be explained more fully hereinafter, a battery 204, having a greater output voltage than the voltage appearing across the output terminals 12 and 14, is provided. For the purpose of increasing the stability of the regulator system illustrated in Fig. 2, a saturable reactor 206 is rendered responsive to the magnitude of the voltage across the output terminals 12 and 14, thereby producing across the terminals 200 and 202 a direct-current voltage proportional to the magnitude of the voltage across the output terminals 12 and 14.

In this instance, the saturable reactor 206 comprises a three-legged magnetic core member 208, load windings 210 and 212 disposed in inductive relationship on the outer legs of the core member 208, and a control winding 214 disposed in inductive relationship with the middle leg of the core member 208. In order that the magnitude of the voltage across the output terminals 12 and 14 can be set to a predetermined value before putting the regulator system into operation, a variable resistor 216 is connected across the output terminals 12 and 14. As illustrated, the battery 204 is interconnected with the variable resistor 216 so that the voltage across the portion of the resistor 216 that is interconnected with the battery 204, opposes the voltage of the battery 204.

In operation, the control winding 214 of the reactor 206 is responsive to the difference between the output voltage of the battery 204 and the voltage across the interconnected portion of the resistor 216. In particular, one end of the control winding 214 of the reactor 206 is connected to one end of the resistor 216 and the other end of the control winding 214 is connected to the negative side of the battery 204.

For the purpose of energizing the load windings 210 and 212 of the saturable reactor 206 and for rectifying the output of the saturable reactor 206, the load windings 210 and 212 are interconnected with the terminals 220 and 222, which have a suitable source of alternating current applied thereto, and with a full-wave dry type rectifier 224. As illustrated, one of the input terminals of the rectifier 224 is connected to the terminal 222 through the load windings 210 and 212 of the saturable reactor 206. The other input terminal of the rectifier 224 is connected to the terminal 220. In order to apply a variable direct-current voltage to the set of terminals 200 and 202 which is proportional to the output of the saturable reactor 206, one of the output terminals of the rectifier 224 is connected to the terminal 202 and the other output terminal of the rectifier 224 is connected to the terminal 200.

In order to energize the load windings 92 and 94 of the saturable reactor 20 and rectify the output of the saturable reactor 20, the load windings 92 and 94 are interconnected with a full-wave dry type rectifier 226 and with a potential transformer 228 having a primary winding 230 and a secondary winding 232. As illustrated, the primary winding 230 is connected across the terminals 220 and 222. On the other hand, one end of the secondary winding 232 is connected to one of the input terminals of the rectifier 226, the other end of the secondary winding 232 being connected to the other input terminal of the rectifier 226 through the load windings 92 and 94 of the saturable reactor 20. For the purpose of applying a corrected voltage to the output terminals 12 and 14, the output terminals of the rectifier 226 are connected to the terminals 12 and 14.

The operation of the apparatus illustrated in Fig. 2 will now be described. With the drum controller 28 in the "on" position, the set of terminals 200 and 202 is connected in circuit relationship with the control winding 22 of the saturable reactor 20 so that the control winding 22 is responsive to the magnitude of the voltage across the output treminals 12 and 14. This circuit extends from the terminal 202 through the movable contact member 68 of the drum controller 28, the control winding 22 of the saturable reactor 20, and the movable contact member 66 of the drum controller 28, to the terminal 200.

Assuming that the drum controller 28 is in the "on" position, and assuming further that the output voltage across the output terminals 12 and 14 increases to a value above the regulated value, then the current flow through the control winding 214 of the saturable reactor 206 decreases to thereby increase the impedance of the load windings 210 and 212 of the reactor 206. With an increase in the impedance of the load windings 210 and 212, the output voltage of the rectifier 224 decreases to thereby decrease the voltage applied to the terminals 200 and 202. A decrease in the voltage across the terminals 200 and 202 effects a decrease in the current flow through the control winding 22 of the saturable reactor 20. A decrease in the current flow through the control winding 22, increases the impedance of the load windings 92 and 94 of the saturable reactor 20, to thereby decrease the output voltage of the rectifier 226 and thus return the voltage across the output terminals 12 and 14 to the regulated value.

On the other hand, assuming the voltage across the output terminals 12 and 14 decreases to a value below the regulated value, then the current flow through the control winding 214 of the saturable reactor 206 increases to thereby decrease the impedance of the load windings 210 and 212 of the saturable reactor 206. With a decrease in the impedance of the load windings 210 and 212, the direct-current voltage across the terminals 200 and 202 is increased to thereby increase the current flow through the control winding 22 of the saturable reactor 20. An increase in the current flow through the control winding 22 decreases the impedance of the load windings 92 and 94 of the saturable reactor 20 to thereby increase the output voltage of the rectifier 226 and thus return the voltage across the output terminals 12 and 14 to the regulated value.

When the drum controller 28 is actuated to the "calibrating" position, a Wheatstone bridge is established by connecting a series circuit, including the manually controlled variable impedance 18, the control winding 22 of the saturable reactor 20, and the preselected impedance 23, across the terminals 200 and 202. This series circuit extends from the terminal 200 through the movable contact member 60 of the drum controller 28, the movable contact member 58, the impedances 18 and 23, the movable contact member 64 of the drum controller 28, the control winding 22 of the saturable reactor 20, the movable contact member 62 of the drum controller 28, and the rectifier 224, to the terminal 200. In this embodiment, the four legs of the Wheatstone bridge comprise the impedances 18 and 23, the control winding 22 of the saturable reactor 20, and the set of terminals 200 and 202. It is to be noted that in establishing the Wheatstone bridge for the apparatus of Fig. 2 a continuous conducting path to the control winding 22 is maintained.

With the drum controller 28 in the "calibrating" position, the manually controlled impedance 18 is adjusted until the indicating lamp 30 no longer glows, at which time the voltage across the impedance 18 is substantially equal to the voltage across the set of terminals 200 and 202. The control apparatus illustrated in Fig. 3 is then in condition to actuate the drum controller 28 to the "off" position. The supply of current through the control winding 22 of the saturating reactor 20 is continuously maintained in actuating the drum controller 28 from the "calibrating" to the "off" position since one must first pass through the "transfer" position, in which position a parallel circuit is established across the terminals 200 and 202. This parallel circuit extends from the terminal 200 through the movable contact member 52 of the drum controller 28, the movable contact member 50, the impedance 18, the movable contact member 56, the movable contact member 54 of the drum controller 28, to the terminal 202.

On actuating the drum controller 28 to the "off" position, the manually controlled impedance 18 remains connected in circuit relationship with the control winding 22 of the saturable reactor 20 and the set of terminals 200 and 202 becomes disconnected from the control winding 22. In particular, current flows from the terminal 203 through the manually controlled variable impedance 18, the movable contact member 48 of the drum controller 28, and the control winding 22 of the saturable reactor 20 to the terminal 203'. Thus, in the "off" position, the output voltage of the regulator system, as it appears across the terminals 12 and 14, is then under the control of the manually controlled variable impedance 18.

Referring to Fig. 3, there is illustrated another embodiment of the teachings of this invention in which like components of Figs. 2 and 3 have been given the same reference characters. In the embodiment illustrated in Fig. 3, a direct-current generator 300, having a field winding 302, is controlled so as to maintain a substantially constant direct-current voltage across the output terminals 12 and 14.

In the embodiments illustrated in Figs. 1 and 2, the voltage across the output terminals 12 and 14 was maintained unchanged in switching from automatic to manual control by establishing a Wheatstone bridge during the switching operation and then securing a balance of the bridge. However, in the embodiment illustrated in Fig. 3, means responsive to the magnitude of the voltage across the output terminals 12 and 14 is provided to apply a variable direct-current voltage proportional to the voltage across the output terminals 12 and 14 to a set of terminals 304 and 306. The voltage across the set of terminals 304 and 306 effects a current flow in a given circuit connected between the points $a$ and $b$ which is proportional to the magnitude of the voltage across the output terminals 12 and 14. Manually adjustable means 308 is provided in order to apply to a set of terminals 310 and 312 a direct-current voltage which can be manually varied. Thus, the manually adjustable means 308 can manually adjust the magnitude of the current flow through the circuit connected between the points $b$ and $c$. Since the terminal 306 is connected to the terminal 312 and since the indicating lamp 30 is connected between the terminal 304 and the terminal 310, the voltage across the set of terminals 310 and 312 can be balanced against the voltage appearing across the terminals 304 and 306 when a drum controller 316, corresponding to the drum controller 28 of Figs. 1 and 2, is in the "on" position. Thus, in the embodiment illustrated in Fig. 3 it is not necessary to establish a Wheatstone bridge during the switching operation in order to maintain the voltage across the output terminals 12 and 14 unchanged in switching from automatic to manual control.

In order to switch from automatic to manual control without interrupting the conducting path to the control means or field winding 302 of the generator 300, switching means, in particular, the drum controller 316 is provided. As illustrated, the drum controller 316 comprises movable contact members 318, 320, 322 and 324, and stationary contacts 326 and 328.

In operation, assuming the drum controller 316 is in the "on" position, so that the set of terminals 304 and 306 and thus the circuit connected between the points $a$ and $b$ is connected in circuit relationship with the field winding 302, and assuming further that the voltage across the output terminals 12 and 14 increases to a value above the regulated value, then the current flow through the control winding 214 of the saturable reactor 206 decreases. A decrease in the current flow through the control winding 214 effects an increase in the impedance of the load windings 210 and 212 of the saturable reactor 206 to thereby decrease the output voltage of the rectifier 224 as applied to the set of terminals 304 and 306. With a decrease in the direct-current voltage applied to the set of terminals 304 and 306, the current flow through the field winding 302 of the generator 300 decreases to thereby decrease the output voltage of the generator 300 and thus return the voltage across the output terminals 12 and 14 to the regulated value. The circuit for applying the direct-current voltage appearing across the set of terminals 304 and 306 to the field winding 302 to the generator 300 extends from the terminal 304 through the movable contact member 324 of the drum controller 316 to one end of the field winding 302 and from the terminal 306 to the other end of the field winding 302 of the generator 300.

On the other hand, assuming the voltage across the output terminals 12 and 14 decreases to a value below the regulated value, then the magnitude of the current flow through the control winding 214 of the saturable reactor 206 increases to thereby decrease the impedance of the load windings 210 and 212 of the reactor 206. A decrease in the impedance of the load windings 210 and 212 effects an increase in the direct-current voltage across the set of terminals 304 and 306 to thereby return the voltage appearing across the output terminals 12 and 14 to the regulated value.

Before switching from automatic to manual control, the voltage across the set of terminals 310 and 312 is balanced against the voltage appearing across the set of terminals 304 and 306. In the embodiment illustrated in Fig. 3, this balancing is accomplished by adjusting the manually adjustable means 308 until the indicating lamp 30 no longer glows. When this condition exists, the voltage across the set of terminals 310 and 312 is substantially equal to the voltage appearing across the set of terminals 304 and 306. The regulator system illustrated in Fig. 3 is now in condition for switching from automatic to manual control without effecting a change in the magnitude of the voltage appearing across the output terminals 12 and 14.

In order to maintain a continuous supply of current to the field winding 302 of the generator 300, and thus an uninterrupted output voltage across the terminals 12 and 14, the drum controller 316 is provided with a "transfer" position which connects the set of terminals 310 and 312 across the set of terminals 304 and 306, and thus connects the circuit between the points $b$ and $c$ in parallel circuit relationship with the circuit between the points $a$ and $b$, while still maintaining the circuit interconnecting the set of terminals 304 and 306 with the field winding 302 of the generator 300. This circuit connecting the set of terminals 310 and 312 across the set of terminals 304 and 306 extends from the terminal 304 through the movable contact members 322 and 320 of the drum controller 316, to the terminal 310, there being a permanent connection between the terminals 306 and 312.

In switching from the "transfer" position to the "off" position, the set of terminals 304 and 306, and thus the circuit between the points $a$ and $b$, is disconnected from the field winding 302 of the generator 300, however, the set of terminals 310 and 312 remain interconnected with the field winding 302 so that the manually adjustable means 308 can be adjusted to control the magnitude of the current flow through the field winding 302 of the generator 300, and thus the magnitude of the voltage across the output terminals 12 and 14.

The apparatus embodying the teachings of this invention has several advantages. For instance, the output voltage of the regulator system is maintained substantially unchanged even though the apparatus is switched from automatic to manual control. In addition, the proper condition for maintaining this voltage substantially constant can be readily obtained by merely observing an indicating lamp, such as the lamp 30. Further, by so interrelating the components of the apparatus hereinbefore described, a continuous conducting path is maintained to the control means such as the control winding 22 of the phase-shifting reactor 20 illustrated in Figs. 1 and 2 or to the field winding 302 of the generator 300, illustrated in Fig. 3. By maintaining a continuous conducting path to these control elements, an inductive transient potential in the regulator system is prevented which in turn prevents a shutdown of the apparatus. An excessive loading of other regulator systems parallel with the regulator systems illustrated herein is also prevented by maintaining these continuous conducting paths.

Since certain changes may be made in the above apparatus and circuits and different embodiments of the invention may be made without departing from the scope thereof, it is intended that all matter contained in the above description or shown in the accompanying drawings shall be interpreted as illustrative and not in a limiting sense.

We claim as our invention:

1. In a regulator system for maintaining an electrical quantity substantially constant, the combination comprising, means responsive to the magnitude of the electrical quantity for effecting a current flow in a given circuit proportional to the magnitude of the electrical quantity, means for manually adjusting the current flow in another circuit, control means for effecting a variation in the magnitude of the electrical quantity, switching means for selectively connecting, first, said given circuit in such circuit relationship with said control means so that said control means is responsive to the magnitude of the electrical quantity, second, for connecting said another circuit in parallel circuit relationship with said given circuit, and third, for disconnecting said given circuit from said control means so that said means for manually adjusting the current flow in said another circuit can be adjusted to control the magnitude of the current flow through said control means and thus the magnitude of said electrical quantity, and indicating means so connected to said given circuit and said another circuit as to indicate when the voltage across said given circuit is substantially equal to the voltage across said another circuit.

2. In a regulator system for maintaining an electrical quantity substantially constant, the combination comprising, means responsive to the magnitude of the electrical quantity for effecting a current flow in a given circuit proportional to the magnitude of the electrical quantity, means for manually adjusting the current flow in another circuit, control means for effecting a variation in the magnitude of the electrical quantity, switching means for selectively connecting, first, said given circuit in circuit relationship with said control means so that said control means is responsive to the magnitude of the electrical quantity, second, for connecting a series circuit including said another circuit and said control means in parallel circuit relationship with said given circuit so that the voltage across said another circuit can be calibrated against the voltage across said given circuit, third, for connecting said another circuit in parallel circuit relationship with said given circuit, and fourth, for disconnecting said given circuit from said control means so that said means for manually adjusting the current flow in said another circuit can be adjusted to control the magnitude of the current flow through said control means and thus the magnitude of said electrical quantity, and indicating means so connected to said given circuit and said another circuit as to indicate when the voltage across said given circuit is substantially equal to the voltage across said another circuit.

3. In a regulator system for maintaining an electrical quantity substantially constant, the combination comprising, a signal responsive variable impedance, the impedance of which is controlled in response to the magnitude of the electrical quantity, a manually controlled variable impedance, control means for effecting a variation in the magnitude of the electrical quantity, a preselected impedance for matching the impedance of said control means, switching means for selectively connecting, first, the signal responsive variable impedance in circuit relationship with said control means so that said control means is responsive to the magnitude of the electrical quantity, second, for connecting a series circuit including the manually controlled variable impedance, said control means and said preselected impedance in parallel circuit relationship with the signal responsive variable impedance so as to establish a Wheatstone bridge the four legs of which comprise said preselected impedance, said control means, the signal responsive variable impedance, and the manually controlled variable impedance, third, for connecting the manually controlled variable impedance in parallel circuit relationship with the signal responsive variable impedance, and fourth, for disconnecting the signal responsive variable impedance from said control means so that the manually controlled variable impedance can be adjusted to control the magnitude of the current flow through said control means and thus the magnitude of said electrical quantity, and indicating means connected across a diagonal of the Wheatstone bridge for indicating when the impedance of the manually controlled variable impedance matches the impedance of the signal responsive variable impedance.

4. In a regulator system for maintaining an electrical quantity substantially constant, the combination comprising, two sets of terminals, means responsive to the magnitude of the electrical quantity for applying a voltage across one of the two sets of terminals that is proportional to the magnitude of the electrical quantity, manually adjustable means for applying to the other of the two sets of terminals a voltage which can be manually varied, control means for effecting a variation in the magnitude of the electrical quantity, switching means for selectively connecting, first, said one of the two sets of terminals in circuit relationship with said control means so that said control means is responsive to the magnitude of the electrical quantity, second, for connecting said other of the two sets of terminals across said one of the two sets of terminals, and third, for disconnecting said one of the two sets of terminals from said control means so that said manually adjustable means can be adjusted to control the magnitude of the current flow through said control means and thus the magnitude of said electrical quantity, and indicating means so connected to said two sets of terminals as to indicate when the voltages across said two sets of terminals are substantially equal.

5. In a regulator system for maintaining an electrical quantity substantially constant, the combination comprising, a set of terminals, a saturable reactor responsive to the magnitude of the electrical quantity for producing across the set of terminals, a voltage proportional to the magnitude of the electrical quantity, a manually controlled variable impedance, control means for effecting a variation in the magnitude of the electrical quantity, a preselected impedance for matching the impedance of said control means, switching means for selectively connecting, first, said set of terminals in circuit relationship with said control means so that said control means is responsive to the magnitude of the electrical quantity, second, for connecting a series circuit including the manually controlled variable impedance, said control means, and said preselected impedance across said set of terminals so as to establish a Wheatstone bridge the four legs of which comprise said preselected impedance, said control means, said set of terminals, and the manually controlled variable impedance, third, for connecting the manually controlled impedance across said set of terminals, and fourth, for disconnecting said set of terminals from said control means so that the manually controlled variable impedance can be adjusted to control the magnitude of the current flow through said control means and thus the magnitude of said electrical quantity, and indicating means connected across a diagonal of the Wheatstone bridge for indicating when the voltage across the manually controlled variable impedance is substantially equal to the voltage across said set of terminals.

6. In a regulator system for maintaining an output voltage substantially constant, the combination comprising, a signal responsive variable impedance, the impedance of which is controlled in response to the magnitude of said output voltage, a manually controlled variable impedance, a phase shifting saturable reactor including a load winding and a control winding for effecting a variation in the magnitude of said output voltage, a preselected impedance, switching means for selectively connecting, first, the signal responsive variable impedance in circuit relationship with said control winding so that said control winding is responsive to the magnitude of said output voltage, second, for connecting a series circuit including the manually controlled variable impedance, said control winding, and said preselected impedance in parallel circuit relationship with the signal responsive variable impedance so as to establish a Wheatstone bridge the four legs of which comprise said preselected impedance, said control winding, the signal responsive variable impedance, and the manually controlled variable impedance, third for connecting the manually controlled variable impedance in parallel circuit relationship with the signal responsive variable impedance, and fourth, for disconnecting the signal responsive variable impedance from said control winding so that the manually controlled variable impedance can be adjusted to control the magnitude of the current flow through said control winding and thus the magnitude of said output voltage, indicating means connected across a diagonal of the Wheatstone bridge for indicating when the impedance of the manually controlled variable impedance matches the impedance of the signal responsive variable impedance, a source of alternating supply voltage, an ignitron rectifier having a cathode, an anode and an ignitor, the cathode and the ignitor of said rectifier being connected to the load winding of said reactor so that the inductance of the load winding controls the output of said rectifier, and circuit means for so connecting the anode and the cathode of the said rectifier to the source of alternating supply voltage that an anode voltage is applied to the said rectifier and the said rectifier controls the magnitude of said output voltage.

7. In a regulator system for maintaining an output voltage substantially constant, the combination comprising, a signal responsive variable impedance, the impedance of which is controlled in response to the magnitude of said output voltage, a manually controlled variable impedance, a phase shifting saturable reactor including a load winding and a control winding for effecting a variation in the magnitude of said output voltage, a preselected impedance, switching means for selectively connecting, first, the signal responsive variable impedance in circuit relationship with said control winding so that said control winding is responsive to the magnitude of said output voltage, second, for connecting a series circuit including the manually controlled variable impedance, said control winding, and said preselected impedance in parallel circuit relationship with the signal responsive variable impedance so as to establish a Wheatstone bridge the four legs of which comprise said preselected impedance, said control winding, the signal responsive variable impedance, and the manually controlled variable impedance, third for connecting the manually controlled variable impedance in parallel circuit relationship with the signal responsive variable impedance, and fourth for disconnecting the signal responsive variable impedance from said control winding so that the manually controlled variable impedance can be adjusted to control the magnitude of the current flow through said control winding and thus the magnitude of said output voltage, indicating means connected across a diagonal of the Wheatstone bridge for indicating when the impedance of the manually controlled variable impedance matches the impedance of the signal responsive variable impedance, said indicating means including an indicating lamp and a ballast lamp connected in series circuit relationship with one another, a source of alternating supply voltage, an ignitron rectifier having a cathode, an anode and an ignitor, the cathode and the ignitor of said rectifier being connected to the load winding of said reactor so that the inductance of the load winding controls the output of said rectifier, and circuit means for so connecting the anode and the cathode of the said rectifier to the source of alternating supply voltage that an anode voltage is applied to the said rectifier and the said rectifier controls the magnitude of said output voltage.

References Cited in the file of this patent

UNITED STATES PATENTS

| 2,318,091 | Myers | May 4, 1943 |
| 2,397,089 | Cox et al. | Mar. 26, 1946 |
| 2,568,391 | Geiselman | Sept. 18, 1951 |